United States Patent [19]
Williams

[11] Patent Number: 6,123,136
[45] Date of Patent: Sep. 26, 2000

[54] RETRACTABLE TOP COVER AND AWNING FOR RECREATIONAL VEHICLE

[76] Inventor: Wilfred J. Williams, 10137 Quarry Hill Pl., Parker, Colo. 80134

[21] Appl. No.: 09/227,328

[22] Filed: Jan. 5, 1999

Related U.S. Application Data

[63] Continuation-in-part of application No. 08/971,215, Nov. 14, 1997, abandoned.

[51] Int. Cl.[7] .................................................. E04F 10/06
[52] U.S. Cl. ............................. 160/72; 160/67; 160/23.1; 135/88.07; 135/88.11
[58] Field of Search .................................. 160/66, 72, 81, 160/56, 23.1; 296/98; 135/88.1, 88.11, 88.12, 88.13, 88.16, 88.17, 88.07, 88.14

[56] References Cited

U.S. PATENT DOCUMENTS

| | | |
|---|---|---|
| 3,317,259 | 5/1967 | Otis ......................................... 160/23.1 |
| 3,498,666 | 3/1970 | Harrawood . |
| 3,515,428 | 6/1970 | Killion . |
| 3,549,198 | 12/1970 | Cappelo ..................................... 296/98 |
| 3,833,011 | 9/1974 | Duffy . |
| 4,023,857 | 5/1977 | Killion . |
| 4,225,175 | 9/1980 | Fredin . |
| 4,516,802 | 5/1985 | Compton . |
| 4,673,208 | 6/1987 | Tsukamoto . |
| 4,805,654 | 2/1989 | Wang . |
| 4,874,196 | 10/1989 | Goldstein et al. . |
| 4,955,661 | 9/1990 | Mattice . |
| 5,031,955 | 7/1991 | Searfoss . |
| 5,065,805 | 11/1991 | Barrett et al. . |
| 5,171,056 | 12/1992 | Faludy et al. . |
| 5,205,605 | 4/1993 | Haddad, Jr. . |
| 5,240,303 | 8/1993 | Hageman . |
| 5,292,169 | 3/1994 | O'Brian . |
| 5,328,228 | 7/1994 | Klassen . |
| 5,340,187 | 8/1994 | Haddad, Jr. . |
| 5,368,056 | 11/1994 | Riggi, Jr. . |
| 5,380,058 | 1/1995 | Short et al. . |
| 5,482,347 | 1/1996 | Clarys et al. . |
| 5,829,818 | 11/1998 | O'daniel ..................................... 296/98 |

*Primary Examiner*—Blair M. Johnson
*Attorney, Agent, or Firm*—Dorsey & Whitney LLP

[57] ABSTRACT

A retractable top cover and awning for recreational vehicles, modular homes, and the like, includes a mechanism for deploying and retracting a flexible top cover and awning panel over the roof of the vehicle and along a side wall of the vehicle to shade both the vehicle roof and any windows or doors in the side wall. A flexible top cover and awning panel is wound and stored on a roller housed in an elongated housing having a removable housing cover. Swinging deployment arms extend the flexible top cover and awning panel from the storage roller. Motors are used to open the housing cover, to turn the roller to assist in rolling or unrolling the flexible top cover and awning panel, and to swing the deployment arms during extension and retraction of the flexible top cover and awning panel.

15 Claims, 13 Drawing Sheets

RETRACTABLE TOP COVER AND AWNING FOR RECREATIONAL VEHICLE

CROSS-REFERENCE TO RELATED APPLICATION

The present application is a continuation-in-part of application Ser. No. 08/971,215, filed Nov. 14, 1997, abandoned, and entitled "Top Cover and Awning for Recreational Vehicle," which is incorporated herein by reference.

FIELD OF THE INVENTION

The present invention relates to retractable and deployable top covers and awnings for recreational vehicles, modular homes, and the like, and more particularly to a mechanism for deploying and retracting a top cover over the roof of a vehicle and an awning along the side of the vehicle.

BACKGROUND OF THE INVENTION

Covers for vehicles such as a load-carrying truck body are known in the art. See, for example, U.S. Pat. No. 4,673,208, issued Jun. 16, 1987 to M. Tsukamoto for "Power-Operated Extendable and Retractable Cover for Truck Beds." This patent discloses an elongated roller which is movable back and forth transversely across the bed of a truck from one side to the other. The roller carries a rolled cover sheet, which is unrolled and re-rolled during the back and forth movement to cover a load in the truck bed. Levers pivotally mounted at opposite ends of the truck carry the roller and are moved by hydraulic power cylinders controlled from inside the cab of the truck. The roller is driven by a chain-and-sprocket arrangement and an elastic draw cord and backup plate arrangement at opposite ends of the truck bed secures and seals the cover sheet at the opposite ends of the bed.

A cover for a slide-out or expandable section of a trailer or like vehicle is shown in U.S. Pat. No. 4,955,661, issued Sep. 11, 1990, to R. Mattice for "Environmentally Protected Expandable Trailer." This patent discloses an automatically retracting cover over the expandable section to prevent accumulation of snow, water, dirt or the like on top of the expandable section.

A top cover and awning combination for an expandable section of a recreational vehicle is shown in U.S. Pat. No. 5,171,056, issued Dec. 15, 1992, to T. Faludy, et al. for "Retractable Awning for Slide-Out Unit on Mobile Home, Recreational Vehicle or the Like." The retractable awning and top cover is secured along an inner edge to the side of the mobile home. The opposite edge of the awning is secured to a torsionally biased roll bar rotatably mounted on the outer ends of support arms which are pivotally mounted to the outer face of the slide-out unit. The awning sheet overlies the top of the slide-out unit when the slide-out unit is extended and further provides an awning for a window in the slide-out unit.

SUMMARY OF THE INVENTION

Embodiments consistent with the present invention include a flexible top cover and awning panel for recreational vehicles, modular homes, and the like. A mechanism deploys and retracts the flexible top cover and awning panel over a roof of the vehicle and along a side wall of the vehicle to shade both the roof and any windows or doors in the side wall.

The flexible top cover and awning panel is wound and stored on a roller housed in an elongated housing with a removable housing cover. Swinging deployment arms extend the panel from the storage roller, and a motor turns the roller to assist in rolling or unrolling the panel.

The flexible top cover and awning panel has opposed longitudinal edges joined by opposed side edges. An elongated housing, having opposite ends, mounts an elongated roller for storing the flexible top cover and awning panel. A deployment beam spaced from and extending parallel to the roller is secured to the flexible top cover and awning panel at one longitudinal edge. The opposite edge of the flexible top cover and awning panel is secured to the roller.

A pair of spaced deployment arms are each rotatably secured at one end to the deployment beam. The deployment arms are substantially coextensive in length with the front and rear edges of the recreational vehicle. The arms are mounted on spaced side frames extending normal to opposite ends of the housing, and the free ends of the arms support the deployment arm for swinging movement over the vehicle roof. A deployment drive motor operatively engages each deployment arm for swinging each of the arms to unroll and deploy the flexible top cover and awning panel over the roof of the vehicle, as a roof cover, and adjacent one side of the vehicle as an awning over the windows and door.

A drive motor is provided for selectively rolling and unrolling the flexible top cover and awning panel on the roller during retraction and deployment, respectively. A housing cover encloses the housing, and an idler roller is journaled on the housing cover for receiving and guiding the panel during rolling and unrolling.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Figure 1:
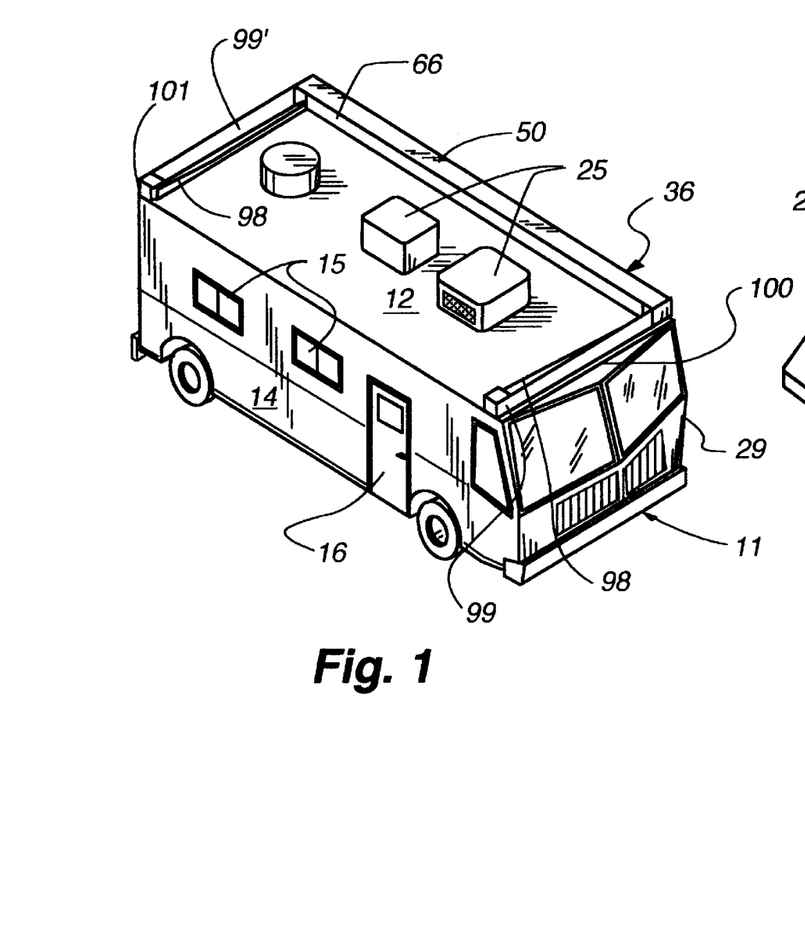
FIG. 1 is a front top perspective view of a recreational vehicle equipped with a retractable top cover and awning embodying the present invention.
Figure 2:
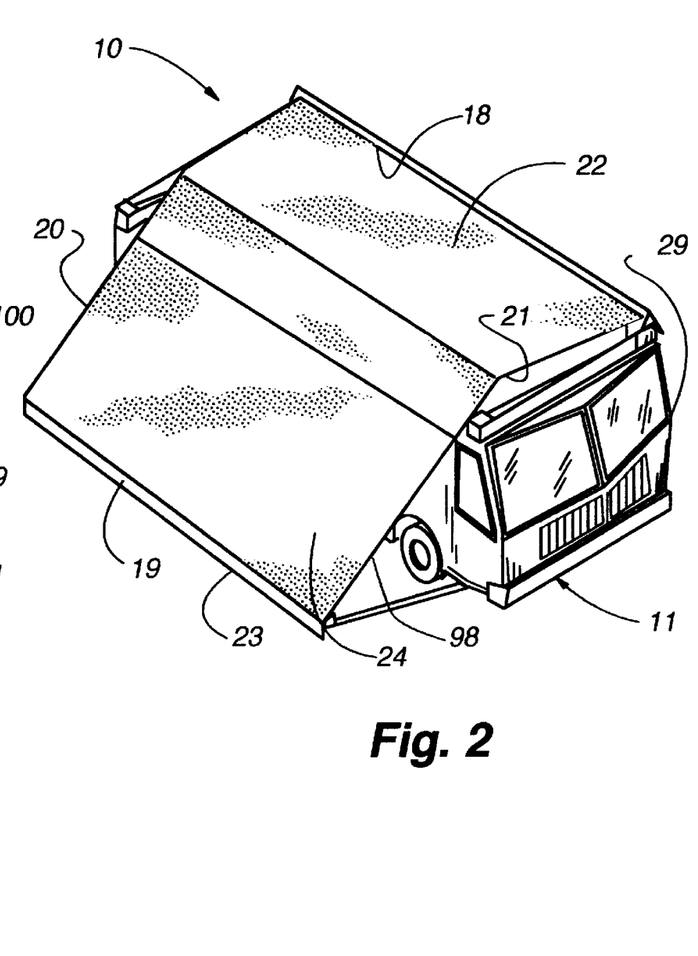
FIG. 2 is a view similar to FIG. 1 but showing the flexible top cover and awning panel fully deployed.
Figure 6A:
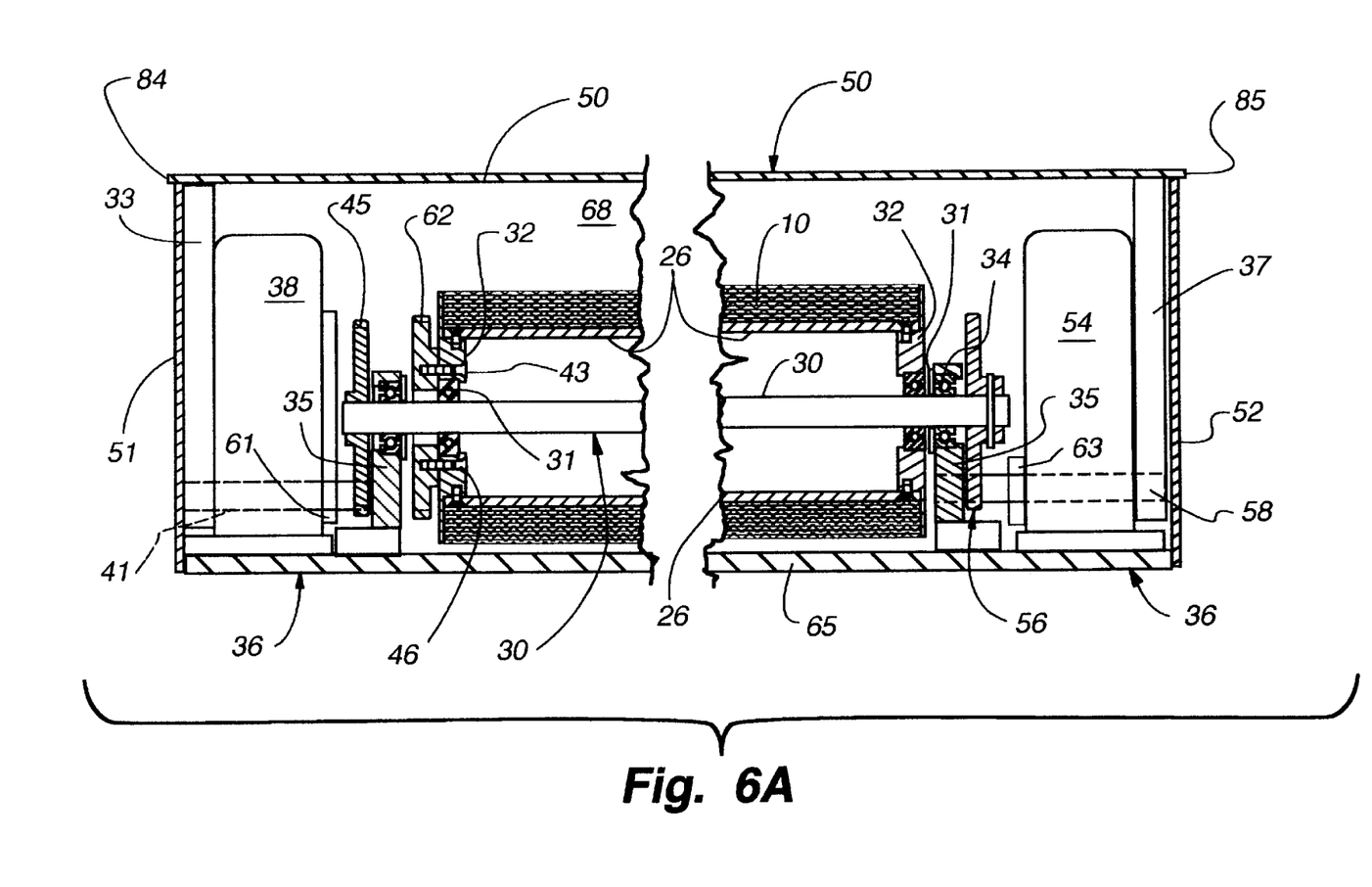
FIG. 6A is a section view taken substantially in the plane of line 6A—6A on FIG. 5.
Figure 6B:
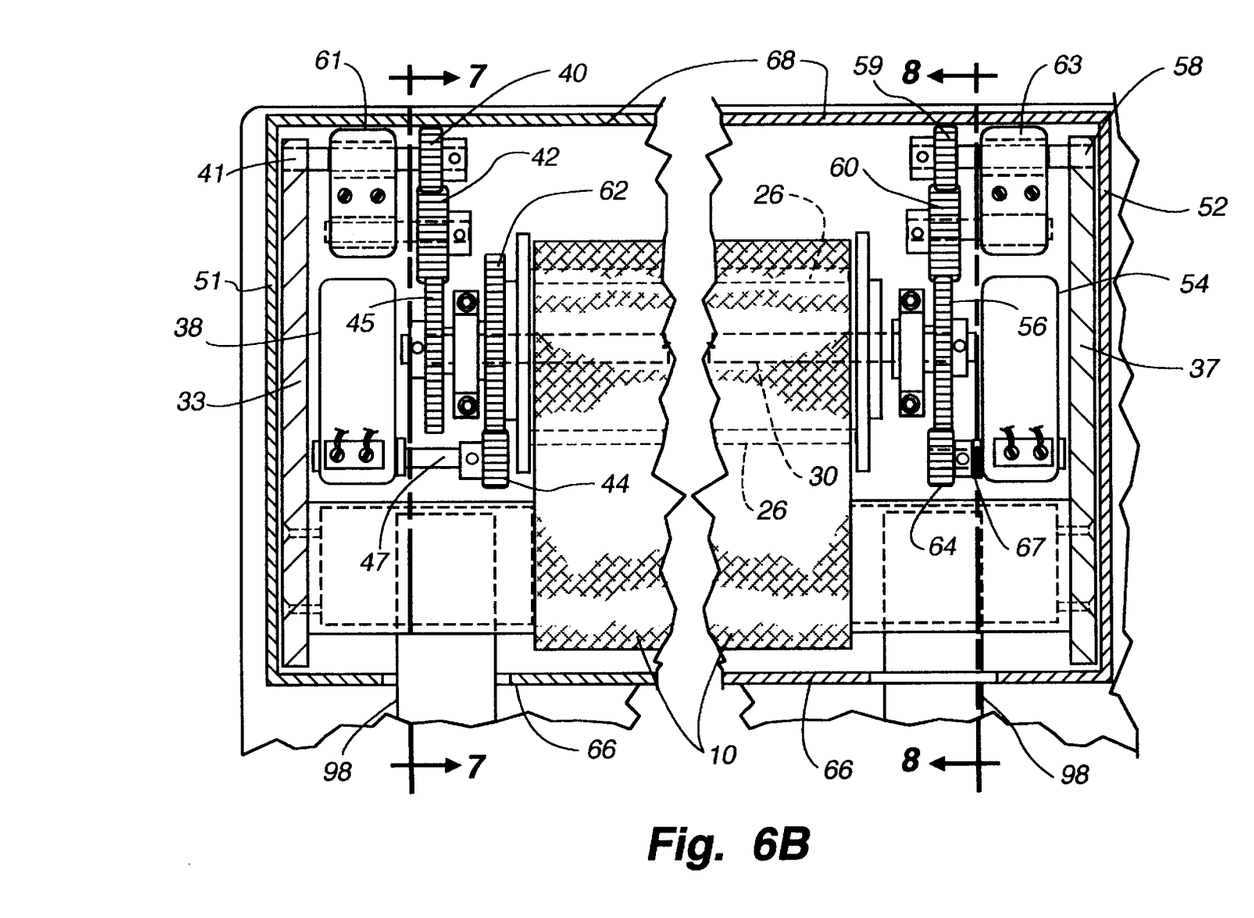
FIG. 6B is a top view of the interior of the retractable top cover and awning mechanism depicted in FIG. 6A.

Embodiments consistent with the present invention include a mechanism, located on a roof 12 of a vehicle 11 (FIG. 1), for deploying and retracting a flexible top cover and awning panel 10 over the roof 12 of the vehicle 11 (FIG. 2). The mechanism includes a housing 36 for containing the flexible top cover and awning panel 10 on a storage roller 26 (FIGS. 6A and 6B). The housing 36 also contain a motor 54 (FIG. 6B) for opening a housing cover 50 (FIG. 1) and a motor 38 for helping to roll and unroll the flexible top cover and awning panel 10 on the storage roller 26. Deployment arms 98 (FIG. 1) are attached to an end of the flexible top cover and awning panel 10.

Figure 3:
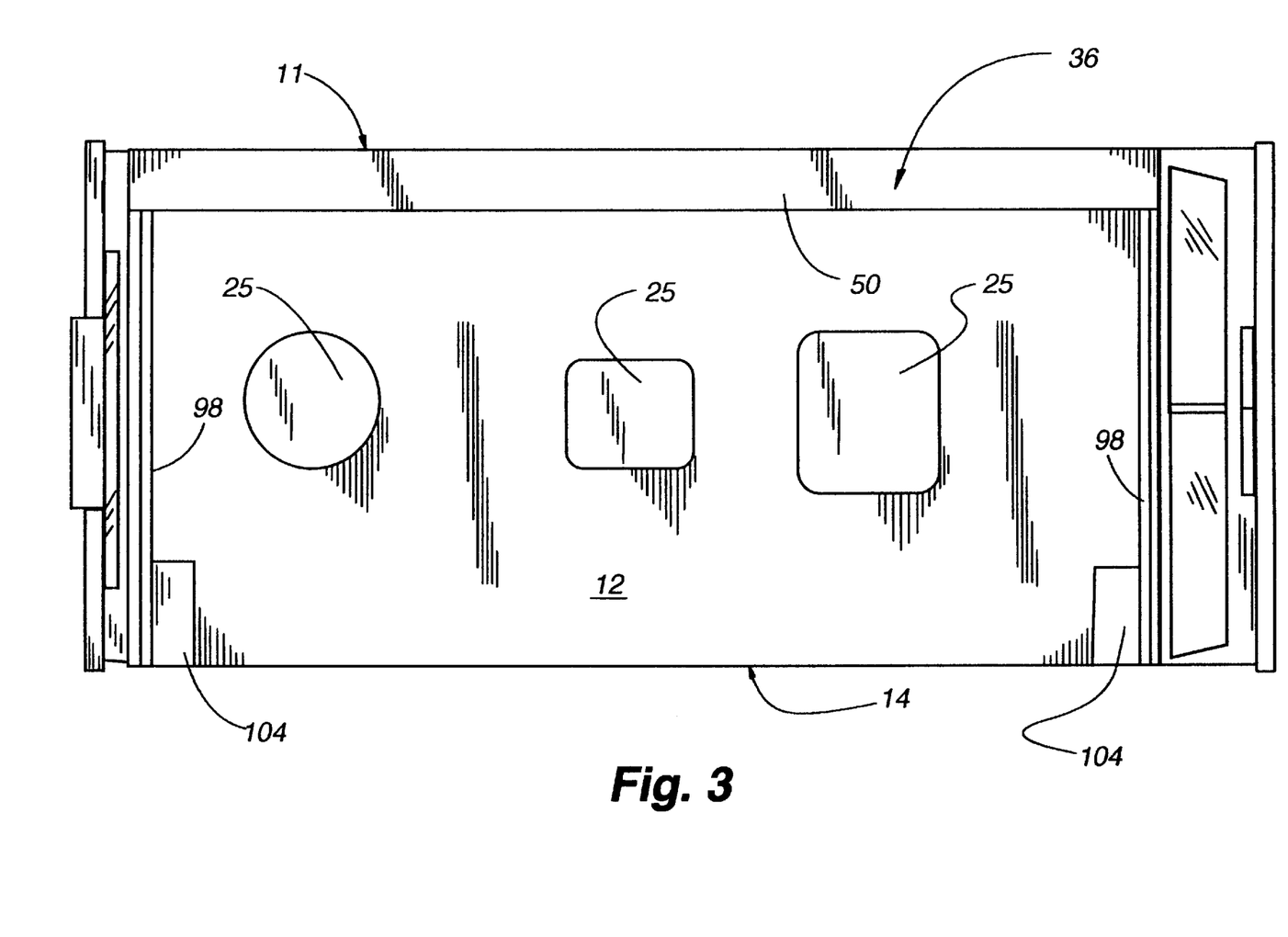
FIG. 3 is an enlarged top plan view of the vehicle and the retractable top cover and awning shown in FIG. 1.
Figure 4:
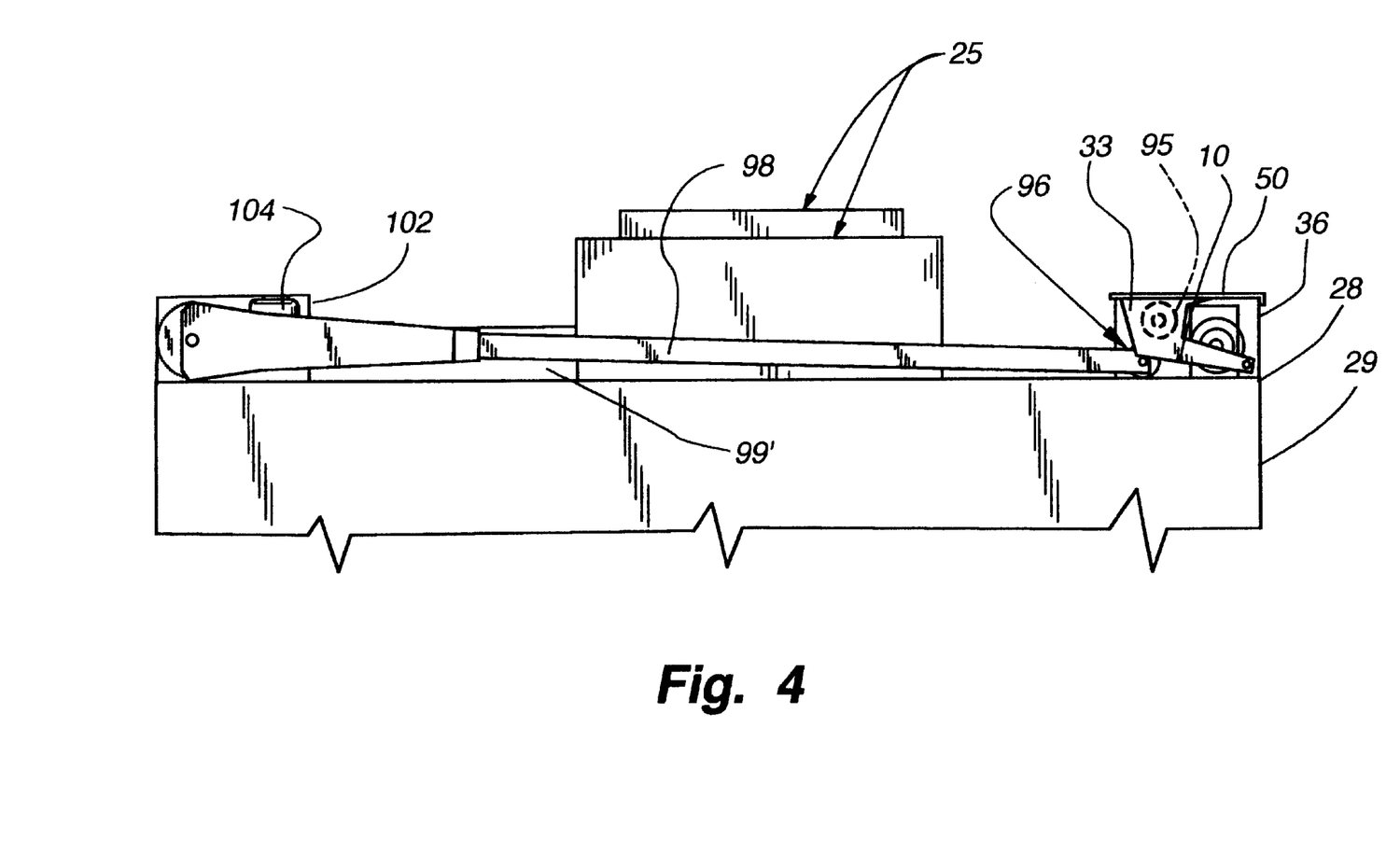
FIG. 4 is an enlarged partial front view of the vehicle shown in FIG. 1 with portions of the awning storage housing broken away for clarity.
Figure 5:
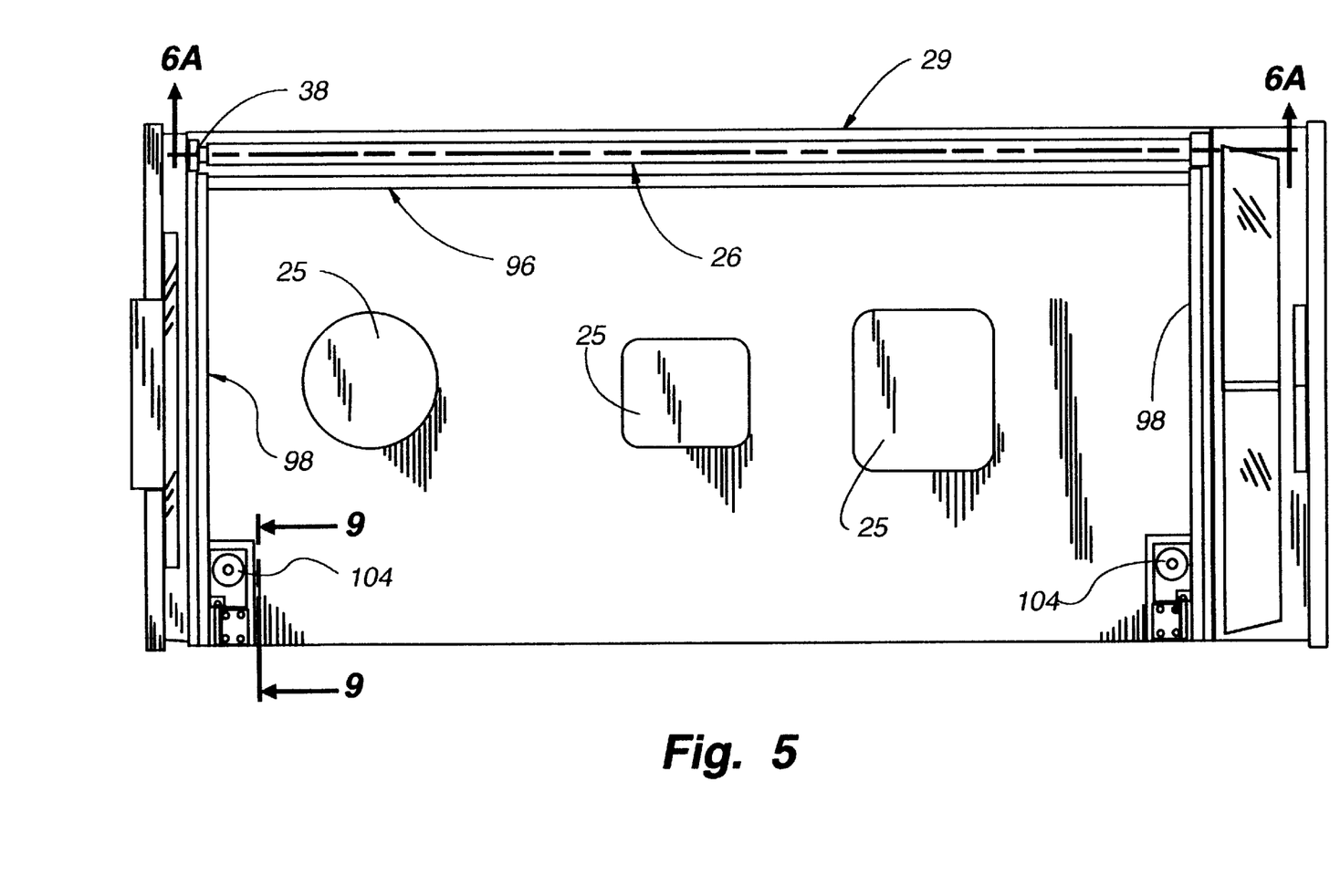
FIG. 5 is an enlarged top plan view of a vehicle and retractable top cover and awning with portions of the awning mechanism covers removed.

In order to deploy the flexible top cover and awning panel 10, the housing cover 50 is first opened using the motor 54 for the housing cover 50. Additional motors 104 (FIG. 3) swing the deployment arms 98 up and over the roof 12 of the vehicle 11 to cover the roof 12, and the deployment arms 98 may also swing beyond the roof 12 to form an awning 24 (FIG. 2). During the deployment, the motor 38 for the storage roller 26 rotates the roller 26 to help unroll the flexible top cover and awning panel 10.

In order to retract the flexible top cover and awning panel 10, the deployment arms 98 swing back into a storage position while the motor 38 for the storage tube 26 rotates the tube 26 to help roll up the flexible top cover and awning panel 10. The housing cover 50 is then closed using the motor 54 for the housing cover 50.

Retractable Top Cover and Awning Mechanism

As shown in FIGS. 1–5, the present invention is embodied in a retractable top cover and awning for a recreational vehicle 11, such as a motor home, trailer, camper and the like. A flexible top cover and awning panel 10 covers a top or roof 12 of the motor vehicle 11 and extends over a side wall 14 to shade windows 15 and a door 16. To this end, the flexible top cover and awning panel 10 is formed of a sheet material or fabric having opposed longitudinal edges 18, 19 (FIG. 2) joined by opposed side edges 20, 21, defining a top cover panel 22 and an awning panel 24 and terminating at its outer edge 19 in a valance 23. The top cover panel 22 extends over the roof 12 of the vehicle 11, and covers various accessories and service devices or units 25, such as air conditioners, fans, vents and the like. Appropriate openings (not shown) may be cut in the top cover panel 22 to allow the service units 25 to extend uncovered above the top cover panel 22 when it is deployed over the roof 12 of the vehicle 11.

The flexible top cover and awning panel 10 is secured at its inner edge 18 to and stored on a wind-up roll or storage roller or tube 26 (FIGS. 6A and 6B), mounted on and extending along the edge of the vehicle roof 12 adjacent the upper edge 28 (FIG. 14) of a side wall 29 of the vehicle 11 opposite the side wall 14 to be shaded. The storage tube or roller 26 is rotatably mounted on a shaft 30 (FIGS. 6A and 6B) by bearings 31 positioned between the shaft 30 and end flanges 32 of the roller 26 (FIG. 6A). The shaft 30 is in turn supported by bearings 34 mounted on brackets 35 supported in housing 36 adapted to enclose the roller 26 with the top cover and awning panel 10 wound on it (FIG. 6A).

Figure 7:
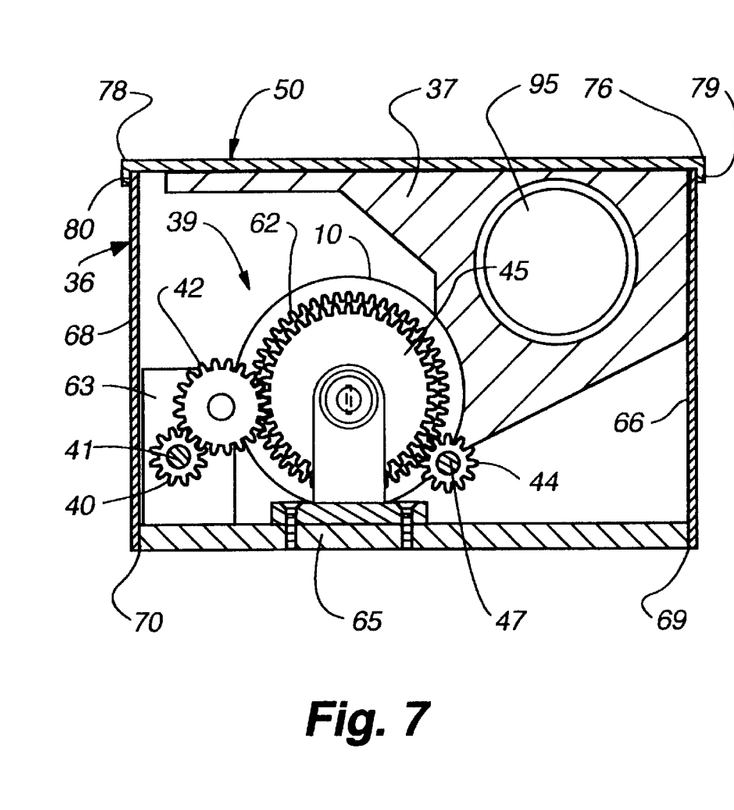
FIG. 7 is a side section view taken substantially in the plane of line 7—7 on FIG. 6B.

To turn the roller 26 for rolling and unrolling the flexible top cover and awning panel 10, a motor 38 is mounted in the housing 36 and is operatively connected to the roller 26 by a gear mechanism 39 (FIGS. 6A, 6B, and 7). The gear mechanism 39 includes a drive gear 44 on a motor shaft 47, which is coupled to gear 62 secured to an end flange 32 of the roller 26 (FIGS. 6A, 6B, and 7).

Figure 8:
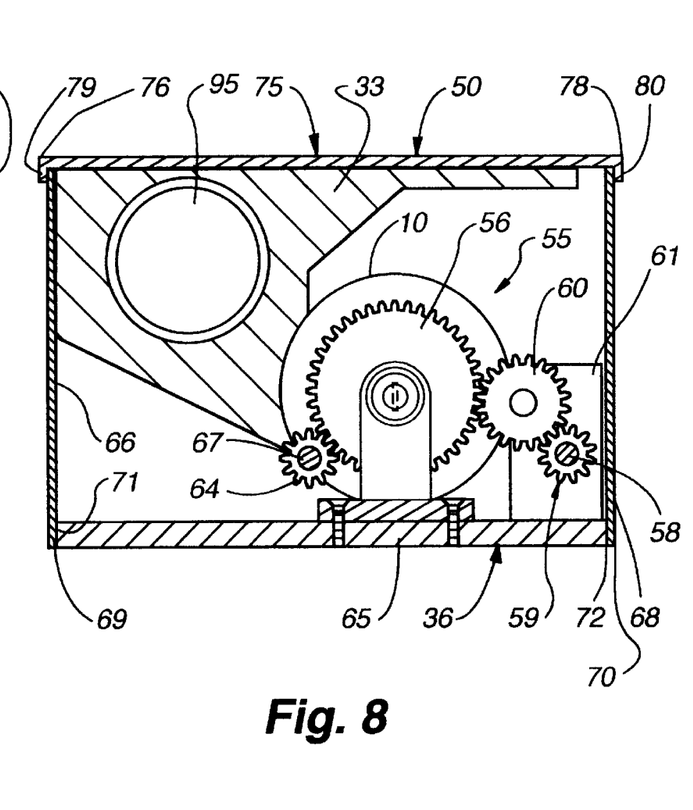
FIG. 8 is a side section view taken substantially in the plane of line 8—8 on FIG. 6B.

The housing 36 has a housing cover 50 having end panels 33, 37 pivoted to the housing 36, and powered open or closed by a drive motor 54 operatively connected to the housing cover 50 by a gear mechanism 55 (FIGS. 6A, 6B, and 8), including a main cover open-and-close gear 56 secured to the main shaft 30 and operatively connected to shaft 58 by a drive spur gear 59 and an idler gear 60 (FIGS. 6A and 6B). Main shaft 30 is powered by drive gear 64 on motor shaft 67 (FIGS. 6B and 8). Main shaft 30 also drives gear 45, which drives idler gear 42 and drive spur gear 40 on shaft 41 (FIGS. 6B and 7). For clarity, FIG. 6A does not show gears 40, 42, 44, 59, 60, and 64.

The housing 36 is defined by an elongated base plate 65 (FIG. 6A), a front or inner elongated panel 66 (FIGS. 6B, 7, and 8), a rear or outer elongated panel 68 (FIGS. 6B, 7, and 8), and side panels 51, 52 (FIGS. 6A and 6B). As best shown in FIGS. 7 and 8, the inner elongated panel 66 is secured at its lower edge 69 to longitudinal edge 71 of the base plate 65. Similarly, outer elongated panel 68 is secured at its lower edge 70 to longitudinal edge 72 of the base plate 65. As best shown in FIG. 6A, side panels 51, 52 are similarly secured to the base plate 65. The housing cover 50 is defined by an elongated cover panel 75 having longitudinal edges 76, 78 defining depending flanges 79, 80, respectively, extending parallel to the longitudinal edges 71, 72, respectively, of the base plate 65 (FIGS. 7 and 8). The elongated cover panel 75 also has lateral edges 81, 85 (FIG. 6A). End panels 33, 37 depend from lateral edges 84, 85, respectively, such that end panels 33, 37 fit inside of side panels 51, 52, respectively, when the housing cover 50 is closed. When the housing cover 50 is closed, the lateral edges 84, 85 of the elongated cover panel 75 rest on the side panels 51, 52, respectively.

The housing cover 50 is hinged to the housing 36 by hinge pins or shafts 41 and 58 secured between the end panels 33, 37 and journaled in brackets 61, 63, respectively, mounted on the elongated base plate 65 (FIGS. 6A and 6B). The shafts 41, 58 are operatively connected to the cover open-and-close gear 56 by appropriate spur gears 42 and 60, respectively, (FIGS. 6A, 6B, 7, and 8). Limit switches (not shown) may be used to limit the open and closed positions of the housing cover 50.

Figure 9:
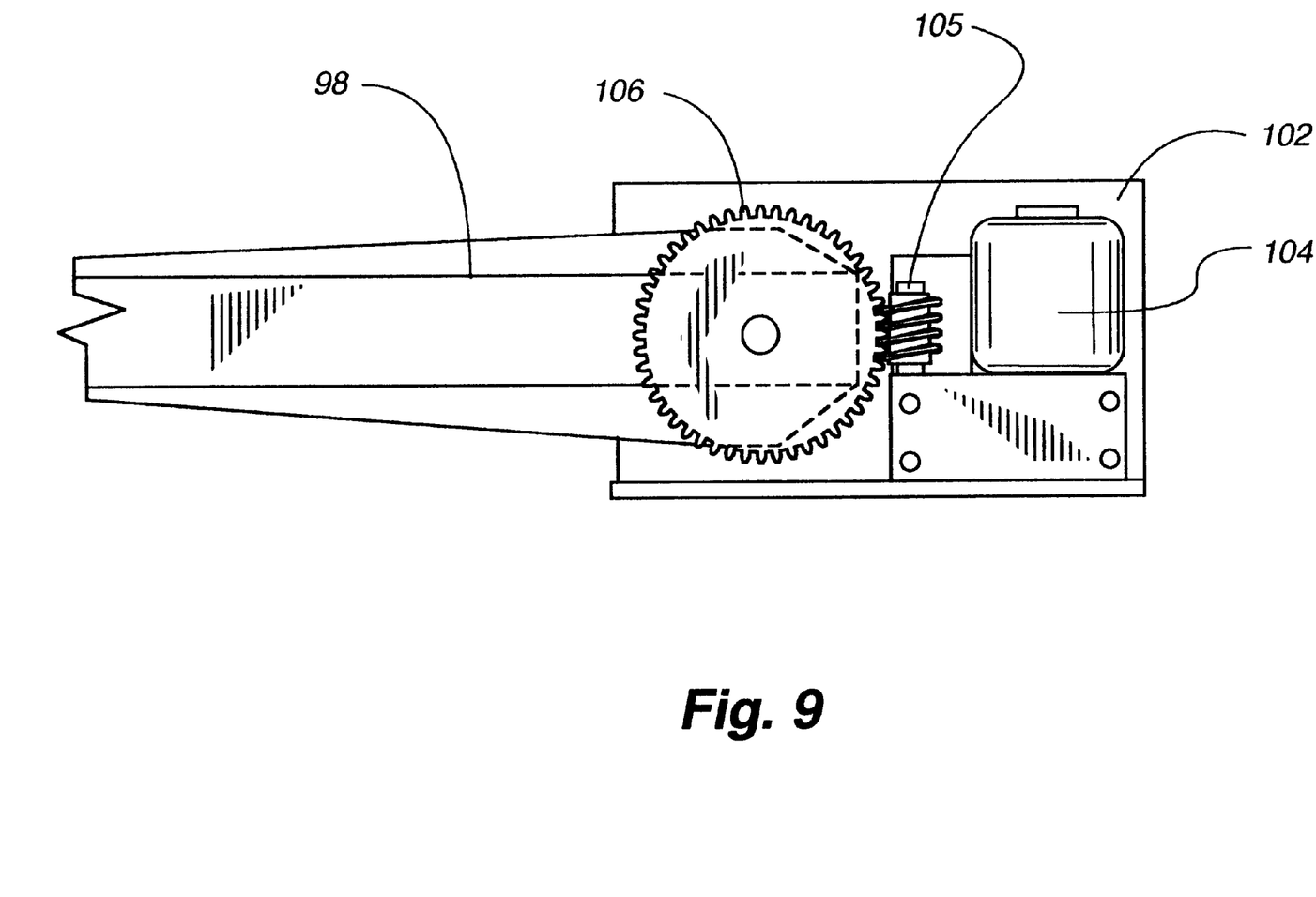
FIG. 9 is a section view taken substantially in the plane of line 9—9 on FIG. 5, but with the deployment arm rotated approximately 180° from its position depicted in FIG. 5.
Figure 10:
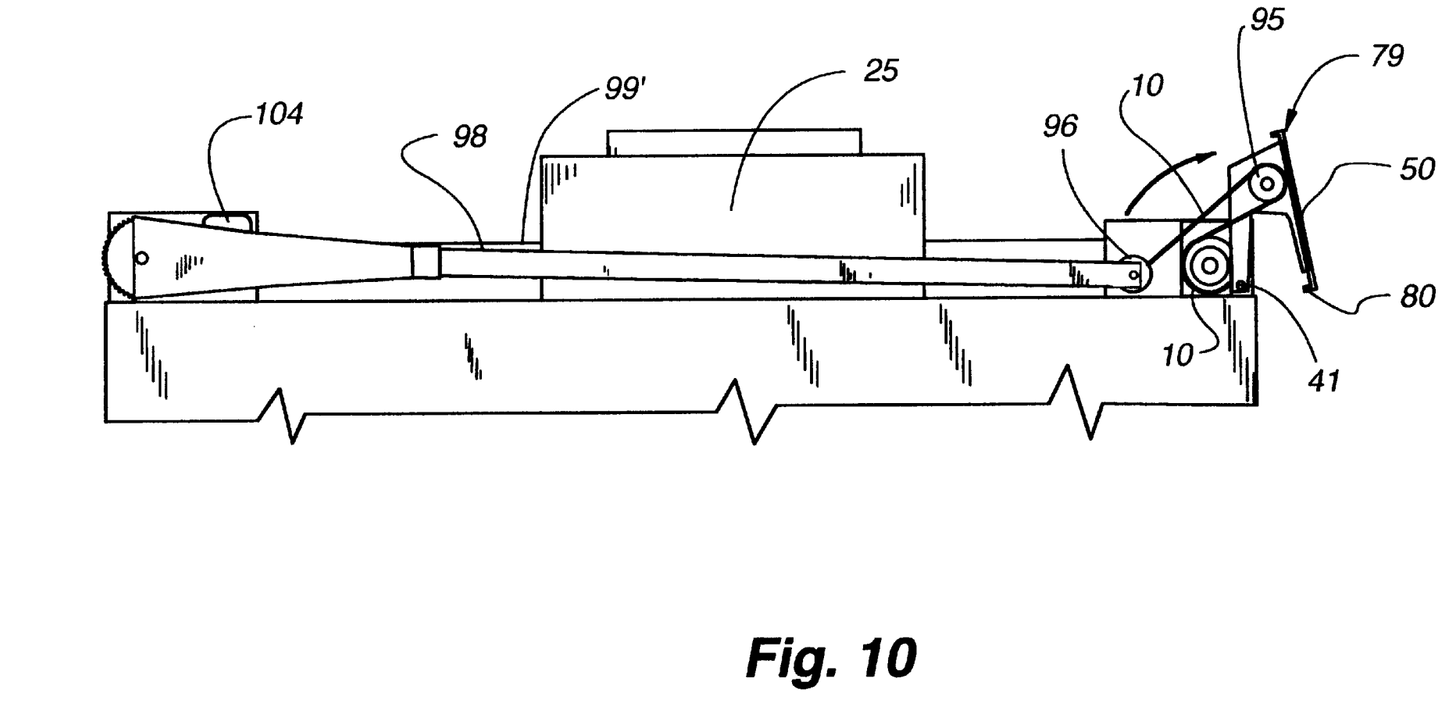
FIG. 10 is a front elevation view similar to FIG. 4, but with the housing cover open.
Figure 11:
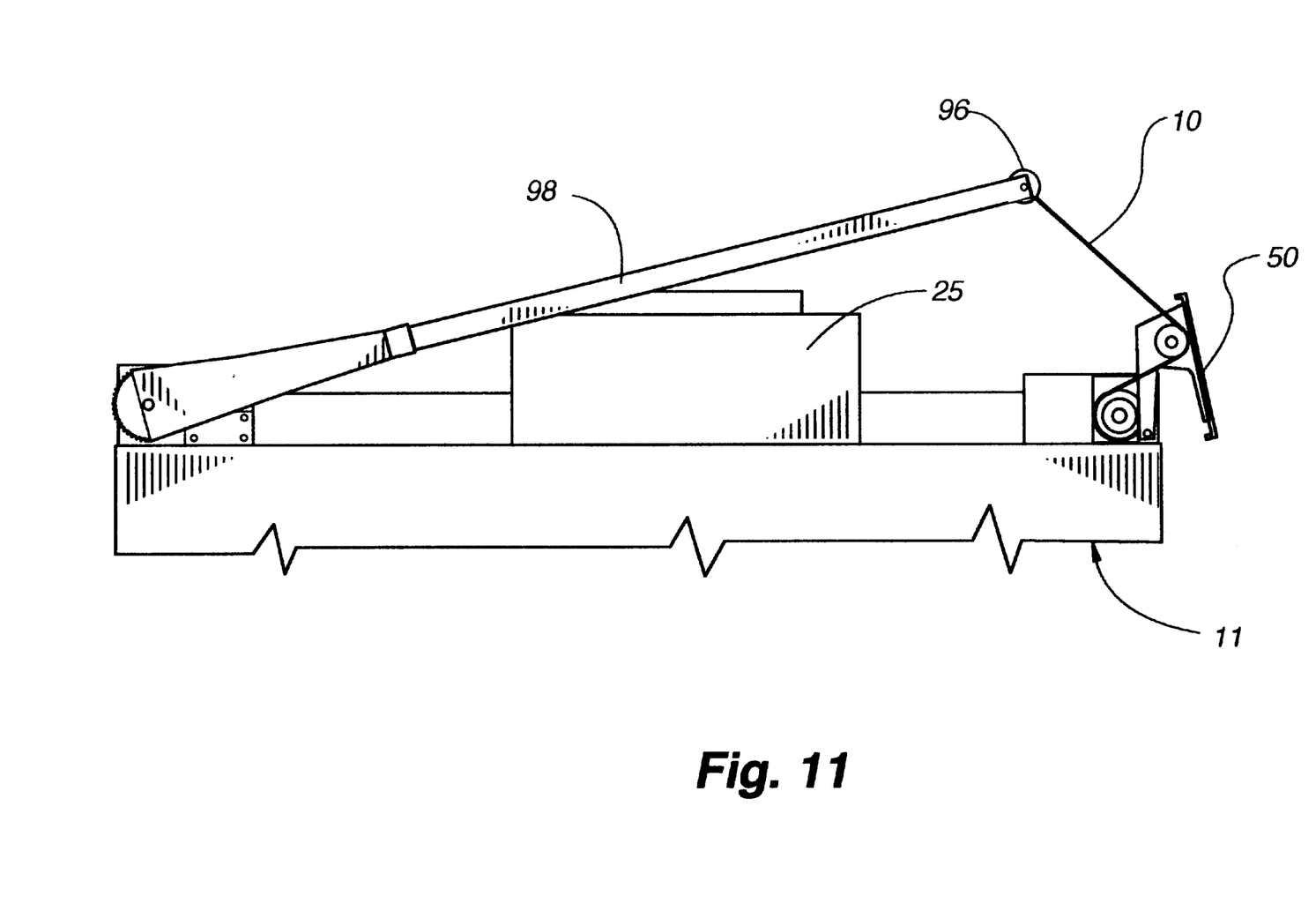
FIG. 11 is a front elevation view similar to FIG. 10, but showing the flexible top cover and awning panel in an initial stage of deployment.
Figure 12:
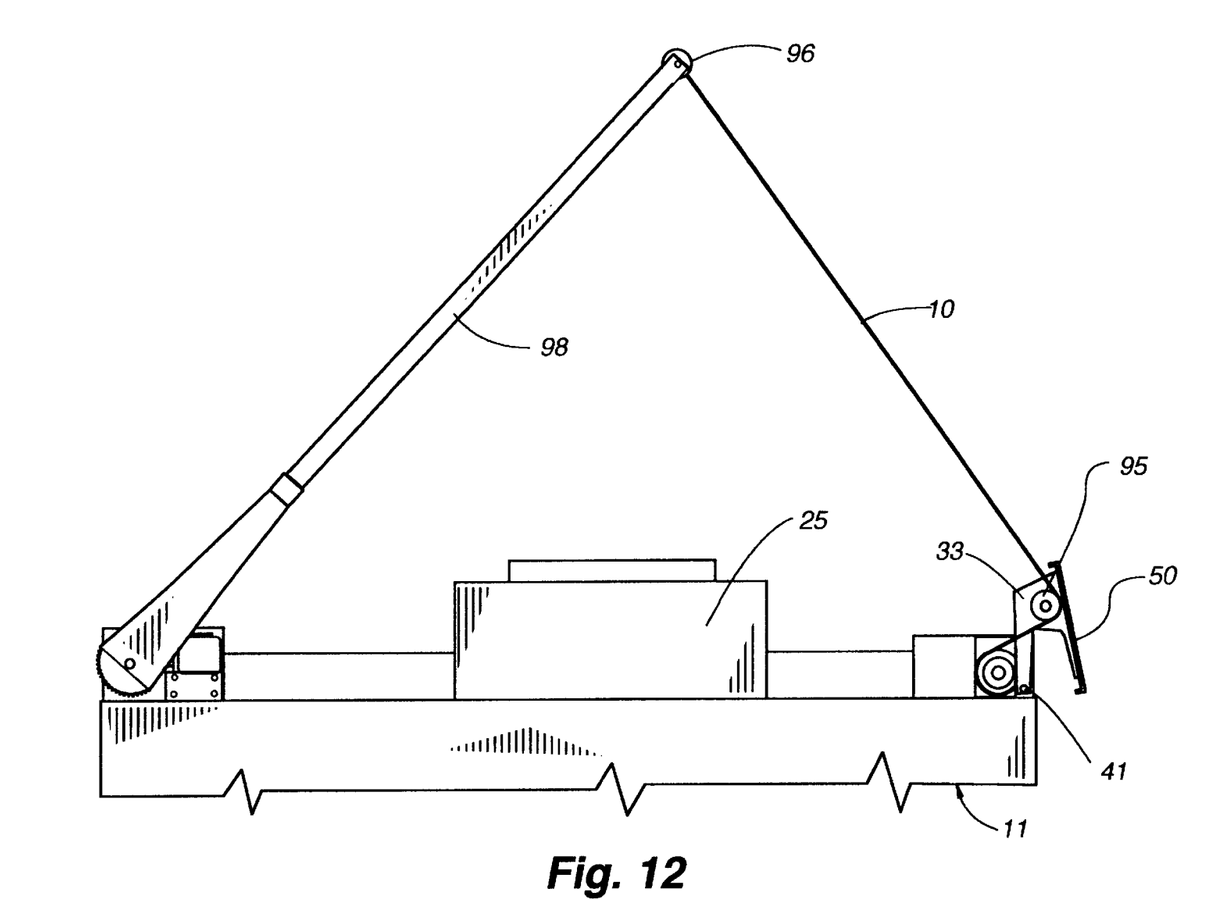
FIG. 12 is a front elevation view similar to FIG. 11, but showing the flexible top cover and awning panel further deployed.
Figure 13:
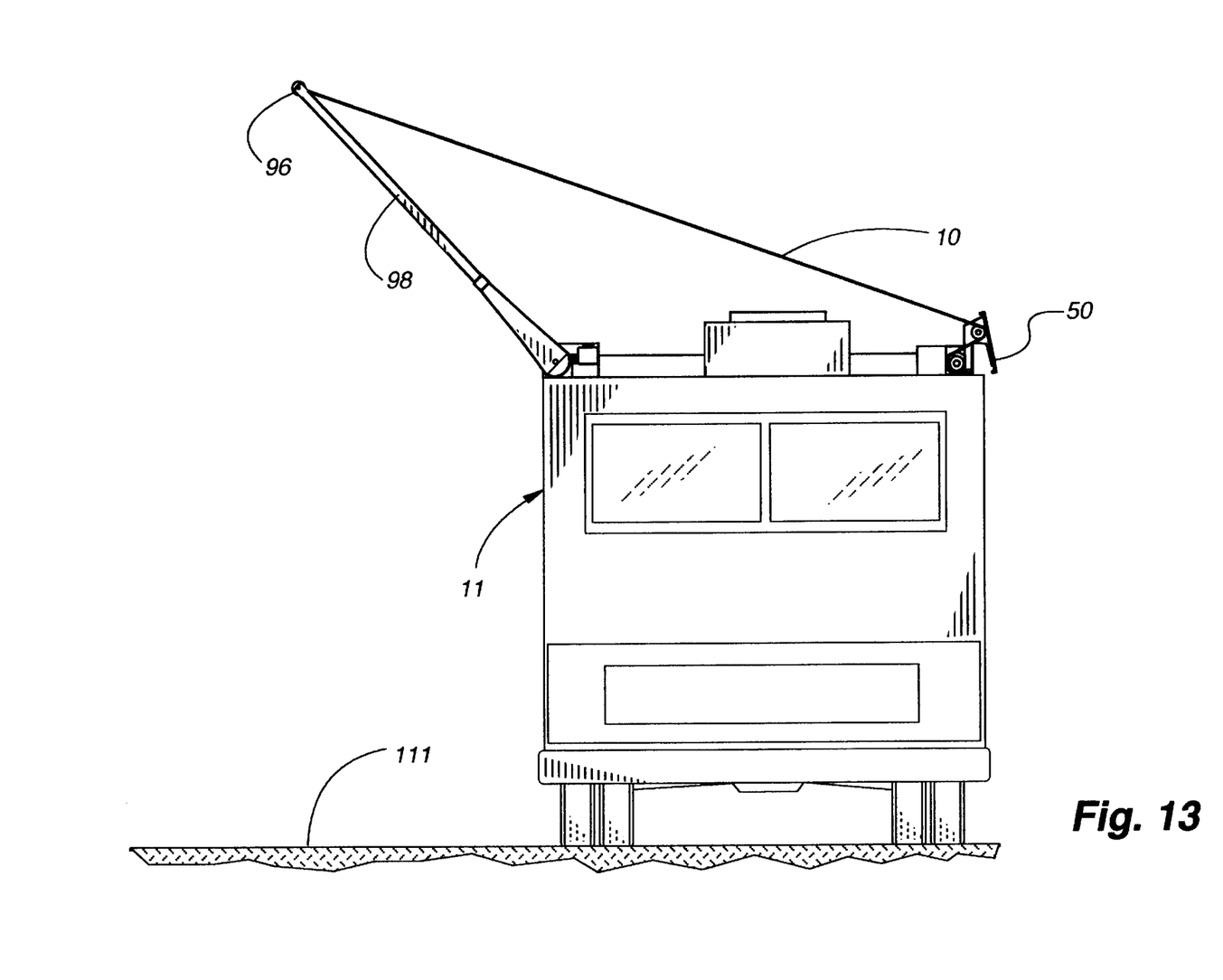
FIG. 13 is a front elevation view of the vehicle showing the flexible top cover and awning panel further deployed.

The flexible top cover and awning panel 10, engaged at its inner edge 18 with the roller 26, extends over a dump bar or idler roller 95 (FIGS. 7 and 8, and 10) extending between and journaled on the end panels 33, 37 of the housing cover 50 to guide the flexible top cover and awning panel 10 during rolling and unrolling. The flexible top cover and awning panel 10 is secured at its outer longitudinal edge 19 to a lead rod or beam 96 rotatably mounted between two awning pivot or deployment arms 98 mounted on side beams 99, 99', respectively, extending from the housing 36 along the front and rear edges 100, 101, respectively, of the vehicle roof 12 (FIGS. 1 and 10–12). The deployment arms 98 are pivotally mounted on brackets 102 at the ends of the side beams 99, 99' (FIG. 9). For swinging the arms 98 about the pivot bracket 102, a motor 104 is operatively connected to each arm 98 by a worm drive gear 105 engaged with a drive gear 106 secured to each arm 98 (FIG. 9). The motor 104 upon operation serves to swing the deployment arms 98 from a closed or nested position upwardly and outwardly to pull the flexible top cover and awning panel 10 from the roller 26 and deploy it over the roof 12 and side wall 14 of the vehicle 11 (FIGS. 2 and 10–14).

FIG. 6B is a top view of the interior of the retractable top cover and awning mechanism, showing more detail concerning the structure for opening the housing cover 50 and for rolling and unrolling the flexible top cover and awning panel 10. The mechanism includes a drive motor 54 for opening and closing the housing cover 50. Motor 54 is connected to a gear 64, which drives a gear 56. Gear 56 drives gear 60, which in turn drives gear 59. Shaft 58 connects gear 59 with end panel 37 attached to the housing cover 50. A bracket 63 houses both shaft 58 and a shaft for gear 60.

Gear 56 is also connected to shaft 30, which is connected to gear 45 on the other side of the mechanism. Gear 45 drives gear 42, which in turn drives gear 40. A shaft 41 connects gear 40 with end panel 33 attached to the housing cover 50. A bracket 61 houses both shaft 41 and a shaft for gear 42.

The mechanism also includes a drive motor 38 for helping roll and unroll the flexible top cover and awning panel 10. Motor 38 is connected to a gear 44, which drives gear 62 connected to roller 26. During rolling and unrolling, motor 38 drives roller 26 through gears 44 and 62 to help roll and unroll the flexible top cover and awning panel 10.

Opening the Retractable Top Cover and Awning

Opening the retractable top cover and awning involves two steps. First, the housing cover 50 is opened. Second, the deployment arms 98 swing up and over the roof 12 of the vehicle 11 to deploy the flexible top cover and awning panel 10.

The first step involves use of drive motor 54 for opening the housing cover 50 (FIGS. 6A, 6B, and 8). Drive motor 54 rotates gear 64, which causes rotation of gear 56. Rotation of gear 56 causes rotation of gear 60 and, in turn, gear 59. Appropriate rotation of gear 59, being attached to end panel 37 through shaft 58, causes end panel 37 to swing upward and raise the lateral edge 85 of the housing cover 50 attached to it. Shaft 30 attached to gear 56 transfers rotation to the other side of the mechanism (FIGS. 6A and 6B). Shaft 30 rotates gear 45, which causes rotation of gear 42 and, in turn, gear 40. Appropriate rotation of gear 40, being attached to end panel 33 through shaft 41, causes end panel 33 to swing upward and raise the other lateral edge 84 of the housing cover 50 attached to it.

The second step involves using motors 104 to swing deployment arms 98 up and over the roof 12 of the vehicle 11 (FIGS. 9–14). Motors 104 use worm gears 105 to rotate gears 106. Appropriate rotation of gears 106 causes deployment arms 98 attached to them to swing up and over the vehicle 11, deploying the flexible top cover and awning panel 10. As deployment arms 98 deploy the flexible top cover and awning panel 10, drive motor 38 helps to unroll it. In particular, drive motor 38 rotates gear 44, which causes rotation of gear 62. Appropriate rotation of gear 62, being attached to roller 26 by bolts 43 and 46 (FIG. 6A), helps to unroll the flexible top cover and awning panel 10 contained on it, reducing the force required to swing the deployment arms 98 upwardly to deploy the flexible top cover and awning panel 10 over the vehicle roof 12.

Figure 14:
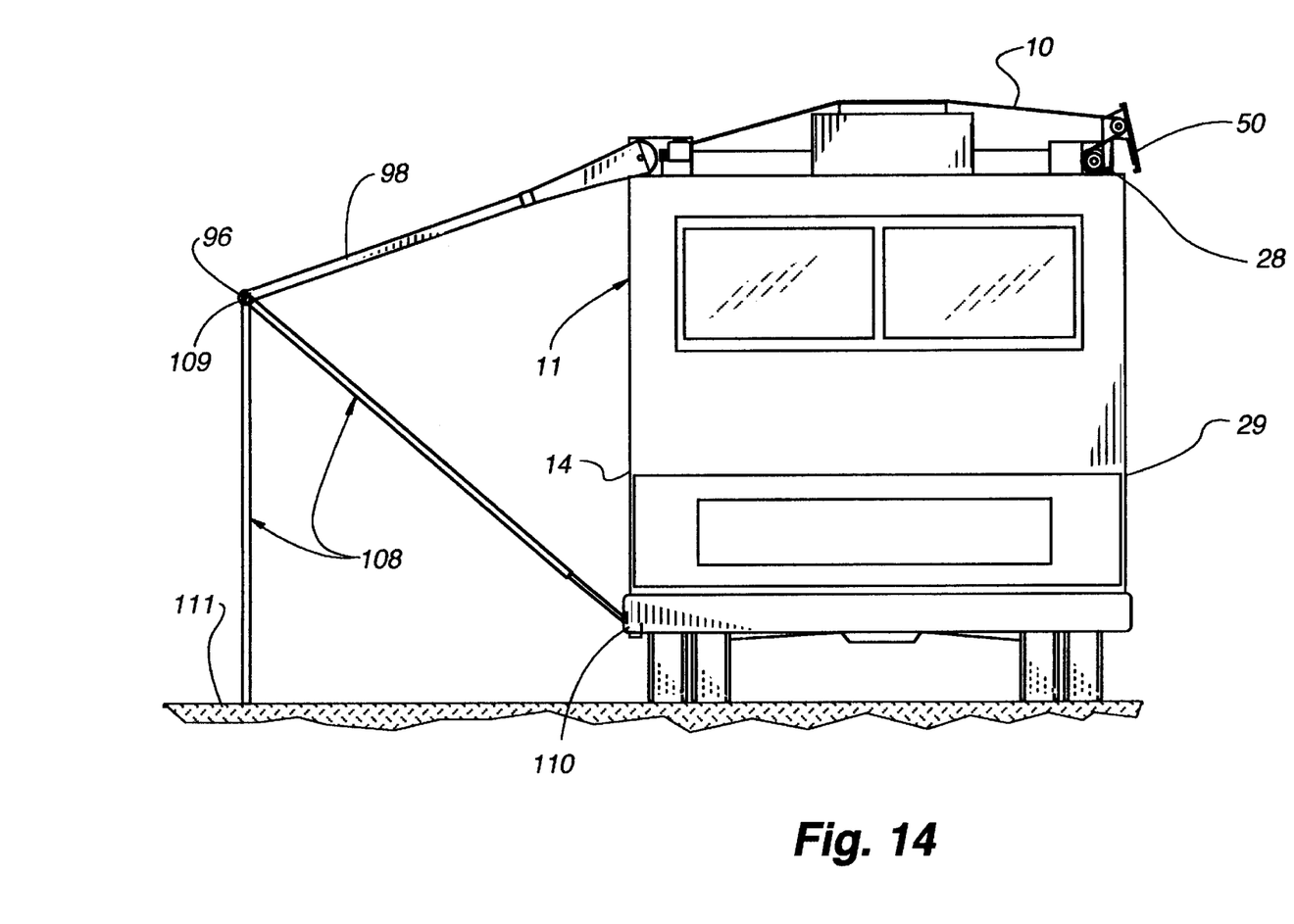
FIG. 14 is a front elevation view of the vehicle showing the flexible top cover and awning panel fully deployed.

As the deployment arm 98 swings upwardly and outwardly (FIGS. 10–14), the flexible top cover and awning panel 10 is positioned over the roof 12 of the vehicle 11. As the deployment arms 98 continue to swing over and outwardly of the vehicle 11, the flexible top cover and awning panel 10 is extended over the side wall 14 of the vehicle 11 outwardly to shade the windows 15 and door 16 (FIG. 1). After the flexible top cover and awning panel 10 is fully extended, appropriate side arm supports 108 (FIG. 14) may be secured to the outer ends 109 of the deployment arms 98 and either extend at a downward angle into engagement with a latch 110 with the side wall 14 of the vehicle 11 to support the outer edge of the awning on the vehicle 11, or are positioned on the ground 111 (FIG. 14).

Closing the Retractable Top Cover and Awning

Closing the retractable top cover and awning involves two steps. First, the deployment arms 98 swing back over the roof 12 of the vehicle 11 to a stored position in order to retract the flexible top cover and awning panel 10. Second, the housing cover 50 is closed.

The first step involves using motors 104 to swing deployment arms 98 back over the top 12 of the vehicle 11 to a stored position (FIGS. 9–14). Motors 104 use worm gears 105 to rotate gears 106. Appropriate rotation of gears 106 causes deployment arms 98 attached to them to swing back over the vehicle 11, retracting the flexible top cover and awning panel 10. As deployment arms 98 swing back, drive motor 38 helps to retract the flexible top cover and awning panel 10. In particular, drive motor 38 rotates gear 44, which causes rotation of gear 62. Appropriate rotation of gear 62, being attached to the roller 26, helps to roll the flexible top cover and awning panel 10 onto it, reducing the force required to swing the deployment arms 98 upwardly to retract the flexible top cover and awning panel 10 from over the vehicle roof 12. In addition, the awning support arms 108 are released from the side wall 14 of the vehicle 11, if they were used.

The second step involves use of drive motor 54 for closing the housing cover 50 after the flexible top cover and awning panel 10 is completely wound on the roller 26 and the deployment arms 98 are positioned against the top 12 of the vehicle 11 (FIGS. 6A, 6B, and 7). Drive motor 54 rotates gear 64, which causes rotation of gear 56. Rotation of gear 56 causes rotation of gear 60 and, in turn, gear 59. Appropriate rotation of gear 59, being attached to end panel 37 through shaft 58, causes end panel 37 to swing downward and lower lateral edge 85 of the housing cover 50 attached to it. Shaft 30 attached to gear 56 transfers rotation to the other side of the mechanism (FIGS. 6A and 6B). Shaft 30 rotates gear 45, which causes rotation of gear 42 and, in turn, gear 40. Appropriate rotation of gear 40, being attached to end panel 33 through shaft 41, causes end panel 33 to swing downward and lower lateral edge 84 of the housing cover 50 attached to it. Closing the housing cover 50 serves to enclose and protect the rolled awning 10 in the housing 36.

While the present invention has been described in connection with an exemplary embodiment, it will be understood that many modifications will be readily apparent to those skilled in the art, and this application is intended to cover any adaptations or variations thereof. For example, hydraulic motors or hand cranks may be used to open and close the flexible top cover and awning panel 10 and the housing cover 50 without departing from the scope of the invention. This invention should be limited only by the claims and equivalents thereof.

I claim:

1. A method of deploying a flexible top cover and awning panel for a vehicle with a roof and a side, using deployment arms having first ends pivotally mounted on the roof of the vehicle and having second ends attached to the flexible top cover and awning panel, the flexible top cover and awning panel stored in a housing having a housing cover, the method comprising:

opening the housing cover; and rotating the deployment arms to swing the second ends of the deployment arms over the roof of the vehicle and extend the flexible top cover and awning panel over the roof and the side of the vehicle.

2. The method of claim 1 wherein said opening step comprises using a housing cover drive motor to raise the housing cover.

3. The method of claim 1 wherein said rotating step comprises using a deployment drive motor to rotate the deployment arms.

4. The method of claim 1, further comprising using a drive motor to unroll the flexible top cover and awning during deployment of the flexible top cover and awning panel.

5. The method of claim 1, further comprising receiving and guiding the flexible top cover and awning panel, using an idler roller during deployment of the flexible top cover and awning panel.

6. The method of claim 1 wherein said rotating step includes extending the flexible top cover and awning panel using a deployment beam attached to opposite ends of the deployment arms and to the flexible top cover and awning panel.

7. The method of claim 6, further comprising securing side arm supports, attached to opposite ends of the deployment beam, to the side of the vehicle.

8. A retractable top cover and awning for a transportable living unit having a roof and side walls, comprising:

a flexible top cover and awning panel having opposed longitudinal edges joined by opposed side edges;

an elongated housing having opposite ends;

an elongated roller mounted in said housing for storing said flexible top cover and awning panel;

a deployment beam spaced from and extending parallel to said roller, said flexible top cover and awning panel being secured at one of said longitudinal edges to said roller and secured at said opposite longitudinal edge to said deployment beam;

a pair of spaced deployment arms each rotatably secured at one end to said deployment beam and adapted to be rotatably mounted at opposite ends to the roof;

a deployment drive motor operatively engaged with each deployment arm for swinging each of said deployment arms to unroll and deploy said flexible top cover and awning panel over the roof of the vehicle as a top cover and adjacent one side of the vehicle as an awning panel;

a housing cover for use in enclosing said housing;

an idler shaft journaled on said housing cover for receiving and guiding said flexible top cover and awning panel during rolling and unrolling of said flexible top cover and awning panel; and a housing cover drive motor operatively coupled to said housing cover, for opening and closing said housing cover.

9. The retractable top cover and awning of claim 8 further comprising:

a shaft mounted in said housing and extending through said elongated roller; and a pair of gears mounted on opposite ends of said shaft, said pair of gears being operatively coupled to said housing cover drive motor and said housing cover.

10. A method of deploying a flexible top cover and awning panel for a vehicle with a roof and a side, using deployment arms having first ends pivotally mounted on the roof of the vehicle and having second ends attached to the flexible top cover and awning panel, the flexible top cover and awning panel stored in a housing having a housing cover, the method comprising:

opening the housing cover using a housing cover drive motor to raise the housing cover;

rotating the deployment arms using a deployment drive motor to swing the second ends of the deployment arms over the roof of the vehicle and extend the flexible top cover and awning panel over the roof and the side of the vehicle;

using a drive motor to unroll the flexible top cover and awning during deployment of the flexible top cover and awning panel; and receiving and guiding the flexible top cover and awning panel, using an idler roller during deployment of the flexible top cover and awning panel.

11. The method of claim 10 wherein said rotating step includes extending the flexible top cover and awning panel using a deployment beam attached to opposite ends of the deployment arms and to the flexible top cover and awning panel.

12. The method of claim 11, further comprising securing side arm supports, attached to opposite ends of the deployment beam, to the side of the vehicle.

13. A retractable top cover and awning for a transportable living unit with a side wall and a roof that has front and rear edges, said retractable top cover and awning comprising:

a flexible top cover and awning panel having opposed longitudinal edges joined by opposed side edges;

an elongated housing having opposite ends;

an elongated roller mounted in said housing for storing said flexible top cover and awning panel;

a deployment beam spaced from and extending parallel to said roller, said flexible top cover and awning panel being secured at one of said longitudinal edges to said roller and secured at said opposite longitudinal edge to said deployment beam;

a pair of spaced deployment arms each rotatably secured at one end to said deployment beam and adapted to be rotatably mounted at opposite ends to the roof;

a deployment drive motor operatively engaged with each deployment arm for swinging each of said deployment arms to unroll and deploy said flexible top cover and awning panel over the roof as a top cover and adjacent the side wall as an awning panel;

a drive motor for selectively rolling and unrolling said flexible top cover and awning panel on said roller during retraction and deployment of said flexible top cover and awning panel;

a housing cover for use in enclosing said housing, wherein said housing cover comprises first and second end panels;

an idler shaft journaled on said first and second end panels of said housing cover for receiving and guiding said flexible top cover and awning panel during rolling and unrolling of said flexible top cover and awning panel; and a housing cover drive motor operatively coupled to said housing cover, for opening and closing said housing cover.

14. The retractable top cover and awning of claim 13, further comprising:

a shaft mounted in said housing and extending through said elongated roller; and a pair of gears mounted on opposite ends of said shaft, said pair of gears being operatively coupled to said housing cover drive motor and said housing cover.

15. A retractable top cover and awning for a transportable living unit with a side wall and a roof that has front and rear edges, said retractable top cover and awning comprising:

a flexible top cover and awning panel having opposed longitudinal edges joined by opposed side edges;

an elongated housing having opposite ends;

an elongated roller mounted in said housing for storing said flexible top cover and awning panel;

a deployment beam spaced from and extending parallel to said roller, said flexible top cover and awning panel being secured at one of said longitudinal edges to said roller and secured at said opposite longitudinal edge to said deployment beam;

a pair of spaced deployment arms each rotatably secured at one end to said deployment beam and adapted to be rotatably mounted at opposite ends to the roof;

a deployment drive motor operatively engaged with each deployment arm for swinging each of said deployment arms to unroll and deploy said flexible top cover and awning panel over the roof as a top cover and adjacent the side wall as an awning panel;

a drive motor for selectively rolling and unrolling said flexible top cover and awning panel on said roller during retraction and deployment of said flexible top cover and awning panel; and side arm supports secured to opposite ends of said deployment beam, wherein said side arm supports are adapted to latch on the side of the transportable living unit.

* * * * *